(12) United States Patent
Min et al.

(10) Patent No.: US 9,801,060 B2
(45) Date of Patent: Oct. 24, 2017

(54) SECURE WIRELESS LOW-POWER WAKE-UP

(71) Applicant: Intel Corporation, Santa Clara, CA (US)

(72) Inventors: Alexander W Min, Portland, OR (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/933,618

(22) Filed: Nov. 5, 2015

(65) Prior Publication Data

US 2017/0134943 A1  May 11, 2017

(51) Int. Cl.
*G06F 1/32* (2006.01)
*H04W 12/06* (2009.01)
*H04W 52/02* (2009.01)
*H04L 29/06* (2006.01)
*H04L 9/32* (2006.01)
*H04W 12/04* (2009.01)

(52) U.S. Cl.
CPC .......... *H04W 12/06* (2013.01); *G06F 1/3209* (2013.01); *H04L 9/3242* (2013.01); *H04L 63/1441* (2013.01); *H04W 12/04* (2013.01); *H04W 52/0212* (2013.01); *H04W 52/0235* (2013.01); *G06F 1/3203* (2013.01)

(58) Field of Classification Search
CPC .............................. G06F 1/3203; G06F 1/3215
USPC .......................................................... 713/323
See application file for complete search history.

(56) References Cited

U.S. PATENT DOCUMENTS

| | | | | |
|---|---|---|---|---|
| 6,101,608 A | * | 8/2000 | Schmidt | H04L 12/12 713/162 |
| 9,277,500 B1 | * | 3/2016 | Solsona-Palomar | H04W 52/0229 |
| 9,477,292 B1 | * | 10/2016 | Murali | G06F 1/3243 |
| 2004/0192207 A1 | * | 9/2004 | Ketola | H04W 52/0235 455/41.2 |
| 2005/0250452 A1 | * | 11/2005 | Walton | H04W 52/029 455/63.4 |
| 2006/0025180 A1 | * | 2/2006 | Rajkotia | H04W 52/0216 455/574 |
| 2006/0105758 A1 | * | 5/2006 | Maislos | H04W 48/04 455/420 |
| 2008/0069358 A1 | * | 3/2008 | Yang | G06F 21/78 380/247 |
| 2009/0029671 A1 | * | 1/2009 | Cho | G01C 21/34 455/345 |
| 2010/0020863 A1 | * | 1/2010 | Shi | H04B 1/719 375/239 |
| 2010/0150042 A1 | * | 6/2010 | Oh | H04W 52/0235 370/311 |
| 2011/0007781 A1 | * | 1/2011 | Camp, Jr. | H04B 1/70718 375/141 |

(Continued)

*Primary Examiner* — Jaweed A Abbaszadeh
*Assistant Examiner* — Volvick Derose
(74) *Attorney, Agent, or Firm* — Schwegman Lundberg & Woessner, P.A.

(57) ABSTRACT

Systems and techniques for secure wireless low-power wake-up are described herein. A low-power wake-up receiver (LP-WUR) of a wireless device may receive a wake-up signal. The LP-WUR may extract a receiver ID token from the wake-up signal. The LP-WUR may then verify the receiver ID token and enable a main transceiver, different than the LP-WUR, when the verification passes to engage in wireless communications.

19 Claims, 5 Drawing Sheets

(56) References Cited

U.S. PATENT DOCUMENTS

| | | | | |
|---|---|---|---|---|
| 2011/0060669 A1* | 3/2011 | Laves | ............... | G06Q 30/04 |
| | | | | 705/34 |
| 2011/0107075 A1* | 5/2011 | Kwak | ............... | H04B 13/005 |
| | | | | 713/2 |
| 2012/0324262 A1* | 12/2012 | Chang | ............... | H04L 5/0053 |
| | | | | 713/320 |
| 2013/0109323 A1* | 5/2013 | Ruutu | ............... | H04B 5/0031 |
| | | | | 455/68 |
| 2013/0336188 A1* | 12/2013 | Yomo | ............... | H04W 52/0206 |
| | | | | 370/311 |
| 2014/0006825 A1* | 1/2014 | Shenhav | ............... | G06F 1/3206 |
| | | | | 713/323 |
| 2014/0129859 A1* | 5/2014 | O'Malley | ............... | G06F 1/3209 |
| | | | | 713/323 |
| 2015/0019887 A1* | 1/2015 | Yu | ............... | H04L 12/12 |
| | | | | 713/310 |
| 2015/0079941 A1* | 3/2015 | Arkko | ............... | H04L 63/123 |
| | | | | 455/411 |

* cited by examiner

SECURE WIRELESS LOW-POWER WAKE-UP

TECHNICAL FIELD

Embodiments described herein generally relate to wireless radio communication and more specifically to secure wireless low-power wake-up.

BACKGROUND

Mobile platform power management plays a role in improving battery-powered platforms, such as smartphones, tablets, wearable, and IoT devices among others. Many mobile platform workloads are communication driven, involving using a wireless transceiver to communicate with other devices. Wireless transceivers and attendant protocols may come in a number of forms, including those that support the IEEE 802.11 (e.g., 802.11ax among others) and IEEE 802.15 (e.g., 802.15.1 among others) families of standards. Often, the wireless radio used for communication is a significant source platform power consumption.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

To address the wireless transceiver power consumption issue noted above, a new radio architecture is described herein. This architecture adds a specially designed low-power (e.g., with ~50 µW active power) wake-up radio (LP-WUR) to existing designs. The LP-WUR receiver is used along with a main wireless radio (e.g., transceiver), and wakes up the main radio when a remote transceiver (e.g., an access point (AP) or other remote sender) indicates that there is in-bound data. For example, when the wireless local area network (WLAN) device (e.g., smartphone) has data to send to the LP-WUR enabled mobile platform, the WLAN device will send a wake-up signal that the LP-WUR receives. After this receipt, the LP-WUR will wake-up (e.g., enable, power-on, etc.) the transceiver.

While LP-WUR can significantly reduce platform power consumption by allowing the transceiver to be in a low-power state (e.g., disabled, powered-off, etc.), simple LP-WUR designs may be vulnerable to a variety of attacks, such as message replay or denial-of-sleep type of attacks which can quickly deplete platform power reserves (e.g., battery). For example, if wake-up signals are sent in plaintext, they may be easily detected and recorded by malicious users (e.g., attackers) using off-the-shelf wireless devices (e.g., spectrum analyzer or soft-defined radio platforms). The captured wake-up signal may be later replayed by an attacker to wake-up radios when no salient communication is pending and result in a waste of energy, which may, in-turn, result in service disruptions.

Due to the nature of LP-WUR (e.g., extremely low power and small die footprint), at least two unique challenges are apparent in protecting LP-WURs from denial-of-sleep attacks. First, LP-WURs typically do not have transmit capabilities, which makes it difficult to apply or implement existing defense mechanisms (e.g., challenge and response, exchanging a secret key, etc.). To address this challenge, the transmission and receipt capabilities of the transceiver are leveraged to implement a variety of defense mechanisms between the local radios and the remote radios. Second, LP-WURs generally have limited processing capabilities, for example, to keep the die size and the energy consumption needs small. Consequently, LP-WURs may not be able to perform encryption/decryption or hashing on-the-fly due to these limited processing capabilities or power budget. Again, the LP-WUR architecture may be integrated with the transceiver to leverage the transceiver's processing capabilities, the LP-WUR offloading compute-intensive operations such as encryption of hashing.

Synthesizing the above discussion, LP-WUR may be protected from denial-of-sleep attacks, and the like, by using a key-hashed (or encrypted) wake-up signal that other attacker cannot (or are very unlikely to be able to) generate. Because of the general limitation of LP-WUR, the transceiver performs the cryptographic functions (e.g., generates and shares a key value) and shares the results with both the LP-WUR (e.g., via an already established secure channel) and the remote transceiver (e.g., an AP). The results given to the LP-WUR may include a key-hashed wake-up token. This token may be stored (e.g., in the LP-WUR or other secure location) before the transceiver goes into a sleep mode. The remote transceiver may later use the generated key value to generate a key-hashed wake-up token to wake-up the transceiver. The LP-WUR may then compares the received token with the stored key-hashed wake-up token, which was pre-calculated by and received from the transceiver. When the received token matches the stored value, the LP-WUR receiver enables the transceiver, and ignores the received transmission otherwise. Accordingly, the LP-WUR prevents attackers (or malfunctioning nodes) from maliciously, or otherwise, waking the transceiver unnecessarily. All of this is accomplished without minimal complexity increases to the LP-WUR.

Figure 1:
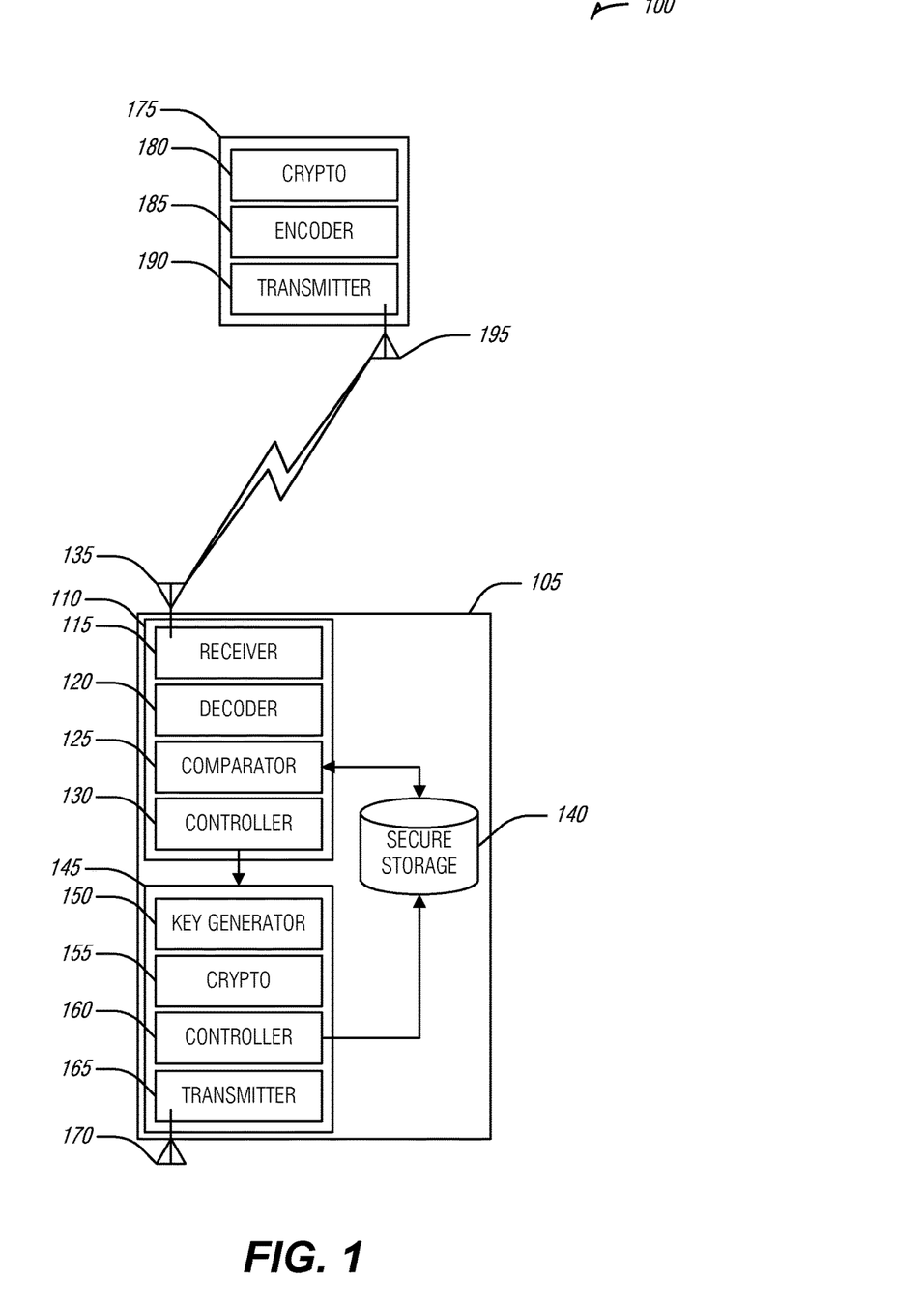
FIG. 1 is a block diagram of an example of system for secure wireless low-power wake-up, according to an embodiment.

FIG. 1 is a block diagram of an example of system 100 for secure wireless low-power wake-up, according to an embodiment. The various components of the system 100 are implemented in computer hardware (e.g., processors, circuits, circuit sets, memories, etc.), such as those described below with respect to FIG. 7. The system 100 includes a device 105 and remote device 175. Here, the term remote denotes a physical separation between the two devices, communications being handled via wireless transmissions.

Figure 4:
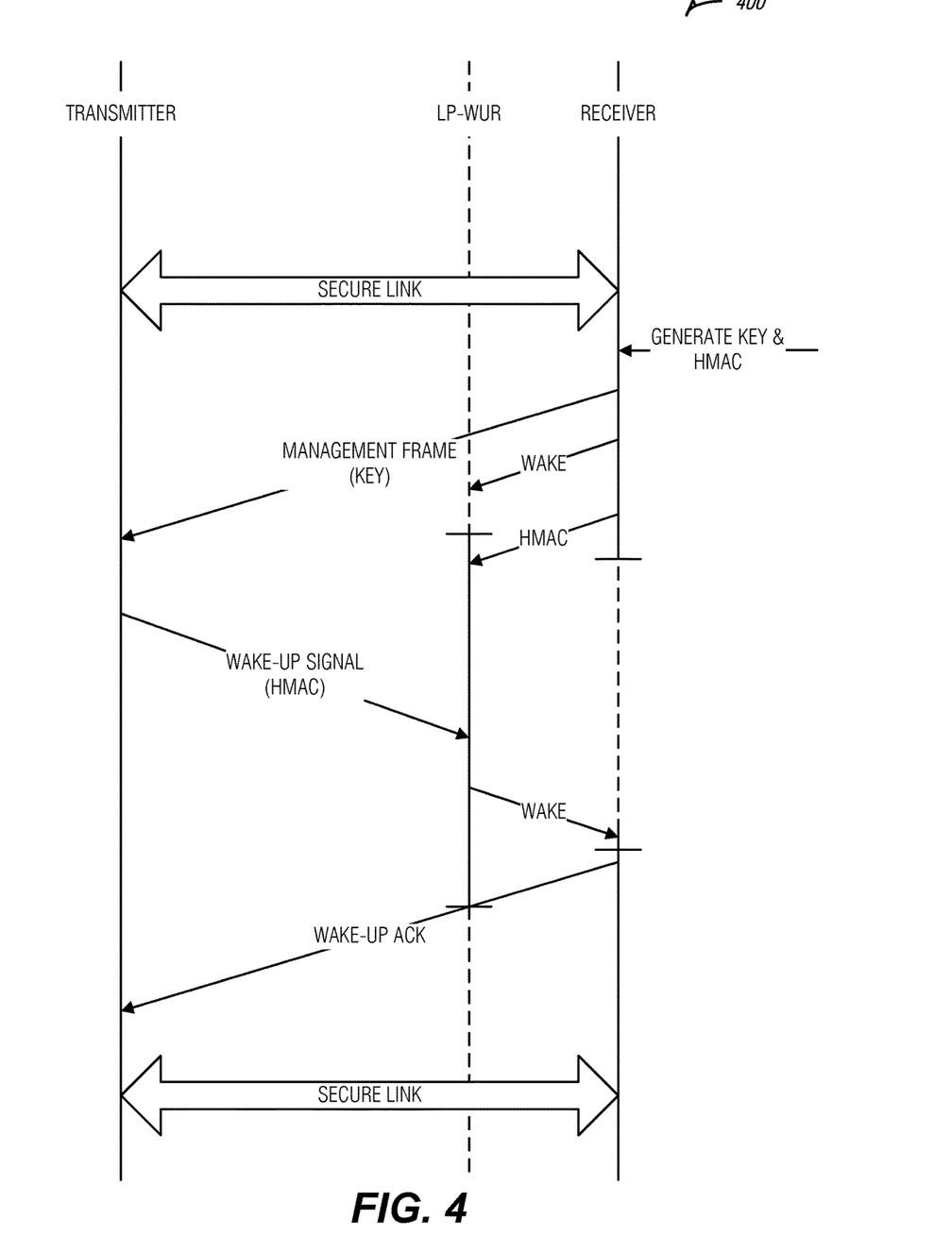
FIG. 4 illustrates a sequence diagram of various devices performing secure wireless low-power wake-up, according to an embodiment.

The device 105 may include a transceiver 145 and a LP-WUR 110. The transceiver 145 and the LP-WUR 110 are different radios. That is, they at least contain transmit or receive chains that are physically distinct from each other in the device 105 such that one may be enabled while the other is disabled, as illustrated in FIG. 4, to achieve the benefit of using the LP-WUR 110.

The transceiver 145 may implement a radio operating in accordance with any of a number of bi-directional communications standards, such as the IEEE 802.11 and 802.15 families of standards. The transceiver 145 may use its own antenna 170 to perform these communications, or may share an antenna with the LP-WUR 110 (e.g., either antenna 135 or antenna 170).

The transceiver 145 may include a key generator 150, a cryptography component 115, a controller 160, and a transmitter 165. The key generator 150 is arranged to acquire (e.g., create, retrieve, or receive) a key. In an example, the key generator 150 may be arranged to create a key, for example, using a bounded random value, prime factorization, or other mechanism of key generation. In an example, the key generator 150 may be arranged to verify that a current session key from a communication with the remote device 175 is different than a last key used to wake up the device 105. In this example, if the current session key is different (e.g., the verification passes), the current session key is used as the key.

The cryptographic component 155 may be arranged to generate a receiver ID token. The receiver ID token is a cryptographically protected embodiment of the transceiver's ID—e.g., used by other devices, such as the remote device 175, to address communications to the transceiver 145. In an example, the receiver ID token is a HMAC created using the key from the key generator 150 and the transceiver's ID.

The controller 160 may be arranged to securely interface with the storage area 140 and therein place the receiver ID token generated by the cryptographic component 155. In an example, the controller 160 is communicatively coupled to the storage area 140 via an interlink shared only with the LP-WUR 110. In an example, the controller 160 may be arranged interface directly with the LP-WUR 110, for example, when the secure storage 140 is located within the LP-WUR 110. In an example, the controller 160 may be arranged to enable the LP-WUR 110 to deliver the receiver ID token.

The transmitter 165 may be arranged to transmit the key provided by the key generator 150 to the remote device 175 in a secure session. As noted below, because this key may be used by the remote device 175 to wake-up the transceiver 145, the transceiver 145 is arranged to transmit the key prior to being disabled. In an example, the transceiver 145, the device 105, or other component of the device 105 may be arranged to disable the transceiver 145 subsequent (e.g., in response to) the transmitter 170 transmitting the key to the remote device 175. In an example, upon the transceiver 145 being enabled by the LP-WUR 110, the transmitter 165 may be arranged to transmit a response frame to the originator of the wake-up signal (e.g., the remote device 175). The response frame indicates to the recipient that the transceiver 145 is enabled (e.g., ready to communicate). In an example, the response frame is a wake-up ACK. In an example, the wake-up ACK is a communication in accordance with the IEEE 802.11 family of standards (e.g., 802.11ax, High Efficiency Wireless (HEW), etc.). In an example, the transceiver 145 may be arranged to disable the LP-WUR 110 in response to the transmission of the response frame. In an example, the transceiver 145 may be arranged to participate in a protocol based communication session with the remote device 175 after being enabled.

The LP-WUR 110 may include a receiver 115, a decoder 120, a comparator 125, and a controller 130. In an example, the secure storage 140 is also included in the LP-WUR 110, for example, as a memory, flash device, etc. In an example, the LP-WUR 110 has a secure connection (e.g., interlink, bus, etc.) to the secure storage 140, which is not located in the LP-WUR 110, but rather in another location of the device 105.

The receiver 115 may be arranged to receive a wake-up signal (e.g., transmission, frame, packet, etc.), for example, from the remote device 175.

The decoder 120 may be arranged to extract a receiver ID token from the wake-up signal. In an example, the decoder 120 may be arranged to extract a sequence of bits from the wake-up signal, the sequence of bits being the receiver ID token. In an example, the sequence of bits may be defined as a fixed number of bits with an offset from the bits in the wake-up signal. For example, the sequence may be defined as sixteen bits offset from the beginning of the wake-up signal by forty bits. In an example, the receiver ID token is demarcated by searchable elements (e.g., tags) that the decoder 120 is arranged to locate to extract the receiver ID token.

The comparator 125 may be arranged to verify the receiver ID token. In an example, to verify the receiver ID token, the comparator 125 may be arranged to compare the received receiver ID token to a stored receiver ID token held, for example, in the secure storage 140. In an example, to compare the received receiver ID token to the stored receiver ID token, the comparator 125 may be arranged to perform a bitwise comparison between the two tokens without additional processing. That is, the comparator 125 simply compares a first bit of each token to each other, a second bit of each token with each other, etc. for every bit of each token. If each pair of bits matches, then the verification passes, otherwise it does not pass.

The controller 130 may be arranged to enable the transceiver 140 when the verification performed by the comparator 125 passes. In an example, in response to enabling the transceiver 140, the controller 130, other component of the LP-WUR 110, or other component of the device 105 may be arranged to disable (e.g., power down, enter a low-power state, etc.) the LP-WUR 110.

The remote device 175 may include a cryptographic element 180, an encoder 185 and a transceiver 190. The transceiver 190 may be arranged to communicate with the device 105 in accordance with a standard wireless protocol. During a secure communications session with the transceiver 145, the transceiver 190 may receive a key, or a key indication (e.g., to use a session key).

The cryptographic element 180 may be arranged to create a local version of the receiver ID token described above using the previously identified key and an ID of the transceiver 145.

The encoder 185 may be arranged to include the locally created receiver ID token in a wake-up signal.

The transceiver 190 may be arranged to communicate the wake-up signal to the LP-WUR 110 (e.g., to receiver 115). In an example, the transceiver 190 may be arranged to receive a response frame from the transceiver 145. In an example, the transceiver 190 may be arranged to engage in standards based wireless communication with the transceiver 145 in response to receiving the response frame.

By cryptographically protecting the receiver's ID, only an authorized party (e.g., remote device 175) may wake the device 105. This prevents malicious denial of sleep attacks designed to reduce the operational life of the device 105. Further, by having the transceiver 145 perform the necessary cryptographic functions, the LP-WUR 110 does not increase in complexity to implement this technique, but rather may rely on a simple verification mechanism. Thus, the LP-WUR 110 more competently fulfills its purpose of reducing power consumption on the device 105.

Figure 2:
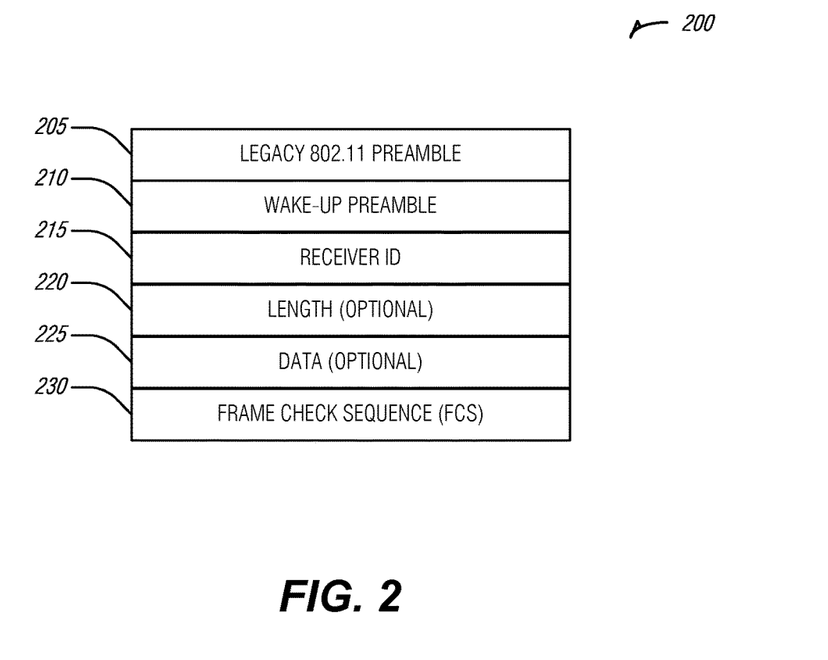
FIG. 2 illustrates a block diagram of an example of a wireless low-power wake-up frame, according to an embodiment.

FIG. 2 illustrates a block diagram of an example of a wireless low-power wake-up frame 200, according to an embodiment. The frame 200 is an IEEE 802.11 frame supporting LP-WUR, including a legacy preamble 205 (so that the frame 200 may be understood by devices that do not implement LP-WUR), a wake-up preamble 210 (indicating that this is a wake-up message), a receiver ID 215 (so that the wireless device may determine that it is the intended recipient of the frame 200), optional length 220 and data fields, and a frame check sequence (FCS) 230 (for error checking). The frame 200 implements a plain text receiver ID 215 field that is prone to the various attacks described above.

Figure 3:
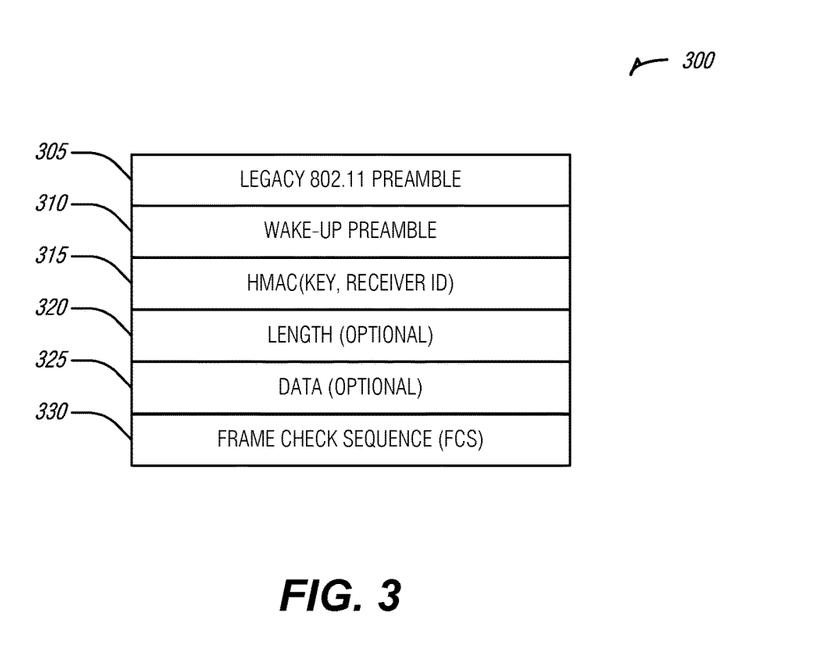
FIG. 3 illustrates an example of a secure wireless low-power wake-up frame, according to an embodiment.

FIG. 3 illustrates an example of a secure wireless low-power wake-up frame 300, according to an embodiment. The frame 300 is an IEEE 802.11 frame supporting secure LP-WUR, including a legacy preamble 305 (so that the frame 200 may be understood by devices that do not implement LP-WUR), a wake-up preamble 310 (indicating that this is a wake-up message), a HMAC 315 (protected receiver ID so that the wireless device may determine that it is the intended recipient of the frame 300 and avoid third party denial of sleep attacks), optional length 320 and data fields, and a frame check sequence (FCS) 330 (for error checking). The frame 300 implements a key-hashed receiver ID 315 that prevents an attacker from waking a device maliciously. However, as this value is readable to the attacker, subsequent wake requests use different keys to generate the HMAC 315, thus preventing replay attacks.

FIG. 4 illustrates a sequence diagram of various devices performing secure wireless low-power wake-up, according to an embodiment. In the illustrated example communication 400, the transmitter is the remote transceiving entity, such as another device, AP, etc., and the LP-WUR and receiver are local to each other and interacting to prevent unnecessary power consumption. The dashed portions of the timelines corresponding to the LP-WUR and the receiver correspond to times in which the respective devices are disabled, demarcated with the enabled times of those devices via the short horizontal lines.

The communication 400 starts with the transmitter and the receiver having a secure link. The receiver then generates a key, and uses that key to create the hashed key value of its receiver ID (illustrated as HMAC). The key itself is communicated to the transmitter via the secure link.

The receiver, anticipating being disabled, enables the LP-WUR. Once the LP-WUR is awakened, the receiver communicates the HMAC to the LP-WUR. Once this is completed, the receiver becomes disabled (e.g., powers itself down).

The LP-WUR remains awake, waiting for a wake-signal. Later, the transmitter uses the previously received key to create its own HMAC of the receiver ID for the receiver. This HMAC is communicated to the LP-WUR. The LP-WUR compares the received HMAC with its stored version of the HMAC provided earlier by the receiver. If the two HMACs match, the LP-WUR will wake the receiver. If they do not match (e.g., the wake-signal was provided in error or by an attacker), the LP-WUR will not wake the receiver, thus saving the device energy.

Once awakened, the receiver transmits a wake-up acknowledgment (ACK) to the transmitter. The LP-WUR may be disabled when this acknowledgment is sent, thus providing additional energy savings. However, following the wake-up ACK, the transmitter and receiver again operate, for example, in a secure link to process standard radio traffic (e.g., IEEE 802.11 communications).

Figure 5:
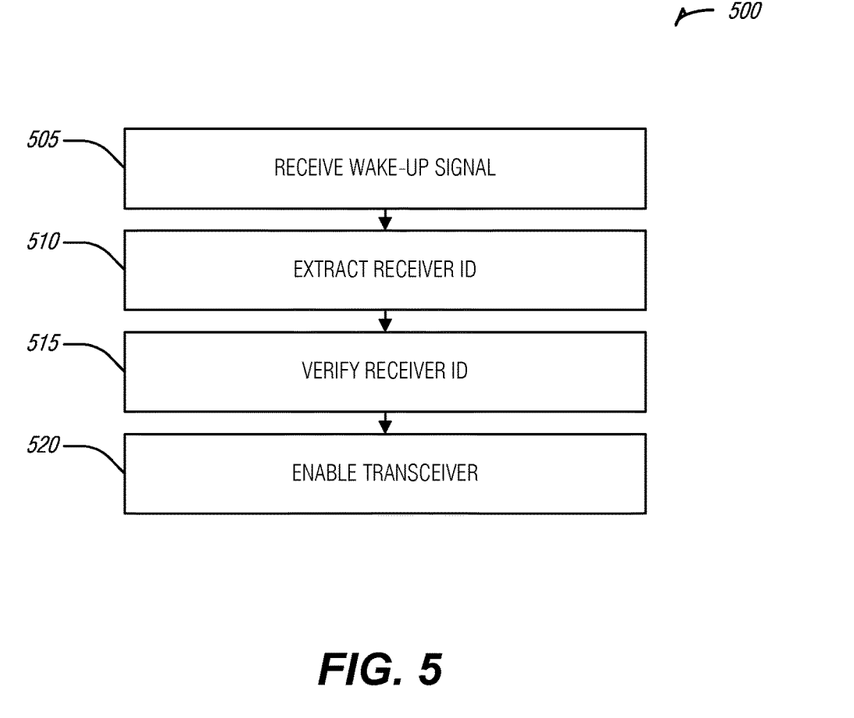
FIG. 5 illustrates a flow diagram of an example of a method for secure wireless low-power wake-up, according to an embodiment.

FIG. 5 illustrates a flow diagram of an example of a method 500 for secure wireless low-power wake-up, according to an embodiment. All of the operations of the method 500 are performed by computer hardware, such as the components described above with respect to FIG. 1, or those described below with respect to FIG. 7 (e.g., circuits, processors, circuit sets, etc.). Accordingly, the methods 500 is a machine-implemented method.

At operation 505, a wake-up signal may be received at a LP-WUR.

At operation 510, the LP-WUR may extract a receiver ID token from the wake-up signal. In an example, extracting the receiver ID token includes extracting a fixed number of bits starting at an offset from either the beginning or the end of the wake-up signal.

At operation 515, the LP-WUR may perform a verification on the extracted receiver ID token. In an example, performing the verification includes comparing the receiver ID token to a stored receiver ID token. In an example, comparing the receiver ID token with the stored receiver ID token is a bitwise comparison without additional processing (e.g., only the bits are compared with each other). In this example, comparison passes (e.g., is verified) if the bits of the receiver ID token match the bits of the stored receiver ID token.

In an example, the method 500 may be optionally extended to include the transceiver generating the receiver ID token. In an example, generating the receiver ID token may include the transceiver generating a new key value. In an example, the key value may be a current session key from a communications session (e.g., IEEE 802.11 session) between the transceiver and the remote transceiver. In this example, the transceiver may verify that the current session key is different than a previous session key last used for the wake-up signal (e.g., to prevent replay attacks). The transceiver may also create an HMAC using the key and an ID of the transceiver, the HMAC being the receiver ID token.

In an example, the transceiver may transmit the new key value to a remote receiver (e.g., entity that may later try and wake the transceiver, such as via the wake-up signal). In an example, the transceiver may be disabled (e.g., by itself or another component) following transmitting the key value. That is, the transceiver remains awake at least long enough to transmit the key value and then goes to sleep.

In an example, the transceiver may store the generated receiver ID token to a storage area. This storage area may be secured by the LP-WUR, in which case, the transceiver wakes the LP-WUR to receive the receiver ID token. In an example, the storage area is accessible by the transceiver and secured to both the transceiver and the LP-WUR.

At operation 520, the LP-WUR may enable the transceiver (e.g., main radio of the device with the LP-WUR) when the verification of operation 515 passes. In an example, enabling the transceiver includes disabling the LP-WUR. In an example, the LP-WUR is disabled in response to a response frame transmitted from the transceiver to the remote transceiver. In this example, the response frame indicates that the transceiver is enabled to the remote transceiver. In an example, the response frame is a wake-up ACK frame.

Figure 6:
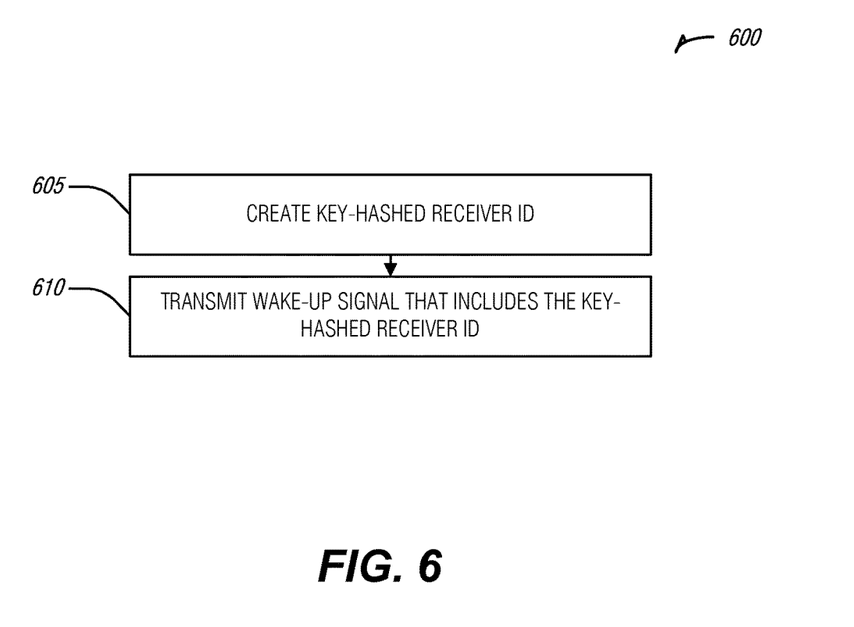
FIG. 6 illustrates a flow diagram of an example of a method for secure wireless low-power wake-up, according to an embodiment.

FIG. 6 illustrates a flow diagram of an example of a method 600 for secure wireless low-power wake-up, according to an embodiment. All of the operations of the method 600 are performed by computer hardware, such as the components described above with respect to FIG. 1, or those described below with respect to FIG. 7 (e.g., circuits, processors, circuit sets, etc.). Accordingly, the methods 600 is a machine-implemented method.

At operation 605, the transceiver (the remote transceiver from the method 500) may create a key-hashed receiver ID token from a key and an ID of the remote transceiver (the device to which the transceiver is attempting to communicate). In an example, the key was received from the remote transceiver during a last secure communication. In an example, the key is a session key of the last secure communication. In an example, the transceiver may verify that the session key is different than a session key previously used to wake-up (e.g., in a wake-up signal) before using the session key as the key.

At operation 610, the transceiver may transmit a wake-up signal (e.g., as a frame, packet, etc.) to a LP-WUR that corresponds to the remote transceiver. Here, the wake-up signal includes the key-hashed receiver ID. In an example, the transceiver may receive a response (frame, packet, etc.) from the remote transceiver following the transmission of the wake-up signal. In response to receiving the response, the transceiver may transmit data to the remote transceiver.

Figure 7:
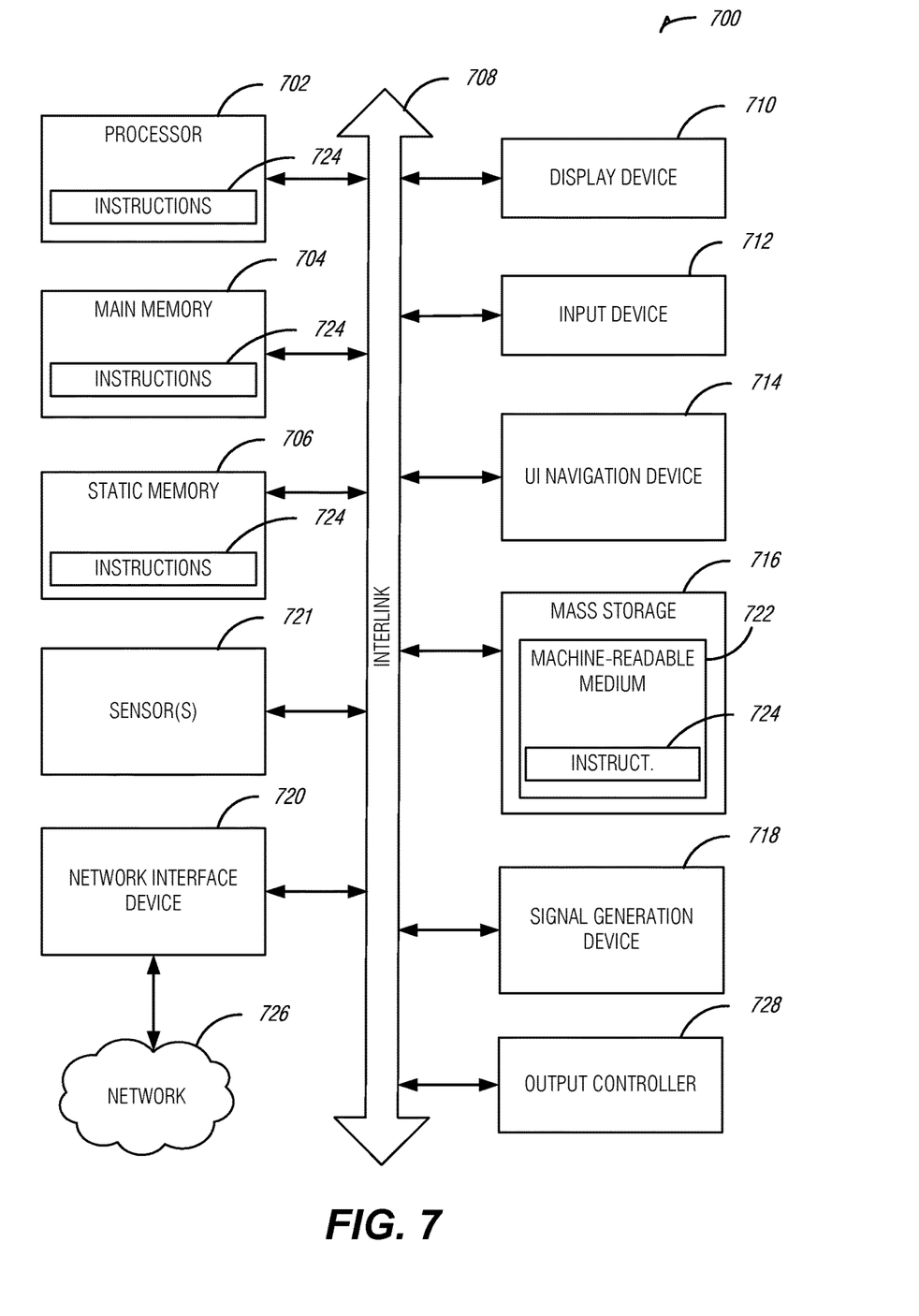
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

As noted above, various embodiments of the described subject matter may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Additional Notes & Examples

Example 1 is at least one machine readable medium including instructions that, when executed by a machine, cause the machine to perform secure wireless low-power wake-up, the machine to: receive a wake-up signal at a low-power wake-up receiver (LP-WUR); extract, by the LP-WUR, a receiver identification (ID) token from the wake-up signal; perform, by the LP-WUR, verification on the receiver ID token; and enable, by the LP-WUR, a transceiver when the verification passes, the transceiver being a different radio than the LP-WUR and disabled.

In Example 2, the subject matter of Example 1 optionally includes, wherein to perform the verification includes comparing the receiver ID token to a stored receiver ID token.

In Example 3, the subject matter of Example 2 optionally includes, wherein comparing the receiver ID token with the stored receiver ID token is a bitwise comparison without additional processing, the comparison passing if the bits of the receiver ID token match the bits of the stored receiver ID token.

In Example 4, the subject matter of any one or more of Examples 2-3 optionally include, wherein the instructions cause a transceiver of the machine to generate the receiver id token.

In Example 5, the subject matter of Example 4 optionally includes, wherein to generate the receiver ID token by the transceiver includes: generating a new key value; and creating a hash-based message authentication code (HMAC) using the key and an ID of the transceiver, the resulting HMAC being the receiver ID token.

In Example 6, the subject matter of Example 5 optionally includes, wherein the instructions cause a transceiver of the machine to transmit the new key value to a remote transceiver, the remote transceiver providing the wake-up signal.

In Example 7, the subject matter of Example 6 optionally includes, wherein the instructions cause the machine to disable the transceiver following transmitting the new key value.

In Example 8, the subject matter of any one or more of Examples 4-7 optionally include, wherein to generate the receiver ID token by the transceiver includes: verifying that a current session key is different than a previous session key last used for the wake-up signal; and creating a hash-based message authentication code (HMAC) using the current session key and an ID of the receiver, the resulting HMAC being the receiver ID token.

In Example 9, the subject matter of any one or more of Examples 4-8 optionally include, wherein the instructions cause a transceiver of the machine to store the receiver ID token to a storage area as the stored receiver ID token.

In Example 10, the subject matter of any one or more of Examples 1-9 optionally include, wherein to enable the transceiver includes disabling the LP-WUR.

In Example 11, the subject matter of Example 10 optionally includes, wherein the instructions cause a transceiver of the machine to transmit a response frame to an originator of the wake-up signal, the response frame indicating that the transceiver is enabled.

In Example 12, the subject matter of Example 11 optionally includes, wherein the response frame is a wake-up acknowledgment (ACK) frame.

In Example 13, the subject matter of any one or more of Examples 11-12 optionally include, wherein to disable the LP-WUR is in response to transmitting the response frame.

Example 14 is at least one machine readable medium including instructions that, when executed by a machine, cause the machine to perform secure wireless low-power wake-up, the machine to create a key-hashed receiver ID token from a key and an identification (ID) of a remote transceiver; and transmit a wake-up signal to a low-power wake-up receiver (LP-WUR) that corresponds to the remote transceiver, the wake-up signal including the key-hashed receiver ID.

In Example 15, the subject matter of Example 14 optionally includes, wherein the instructions cause the machine to receive the key from a last secure communication with the remote transceiver.

In Example 16, the subject matter of any one or more of Examples 14-15 optionally include, wherein the instructions cause the machine to: verify that a session key for a last secure communication with the remote transceiver is different than a session key of a previous wake-up signal; and use the session key as the key.

In Example 17, the subject matter of any one or more of Examples 14-16 optionally include, wherein the instructions cause the machine to: receive a response packet from the remote transceiver indicating that the remote transceiver is awake; and transmit data to the remote transceiver.

Example 18 is a machine-implemented method for secure wireless low-power wake-up, the method comprising: receiving a wake-up signal at a low-power wake-up receiver (LP-WUR); extracting, by the LP-WUR, a receiver identification (ID) token from the wake-up signal; performing, by the LP-WUR, verification on the receiver ID token; and enabling, by the LP-WUR, a transceiver when the verification passes, the transceiver being a different radio than the LP-WUR and disabled.

In Example 19, the subject matter of Example 18 optionally includes, wherein performing the verification includes comparing the receiver ID token to a stored receiver ID token.

In Example 20, the subject matter of Example 19 optionally includes, wherein comparing the receiver ID token with the stored receiver ID token is a bitwise comparison without additional processing, the comparison passing if the bits of the receiver ID token match the bits of the stored receiver ID token.

In Example 21, the subject matter of any one or more of Examples 19-20 optionally include the transceiver generating the receiver id token.

In Example 22, the subject matter of Example 21 optionally includes, wherein generating the receiver ID token by the transceiver includes: generating a new key value; and creating a hash-based message authentication code (HMAC) using the key and an ID of the transceiver, the resulting HMAC being the receiver ID token.

In Example 23, the subject matter of Example 22 optionally includes the transceiver transmitting the new key value to a remote transceiver, the remote transceiver providing the wake-up signal.

In Example 24, the subject matter of Example 23 optionally includes disabling the transceiver following transmitting the new key value.

In Example 25, the subject matter of any one or more of Examples 21-24 optionally include, wherein generating the receiver ID token by the transceiver includes: verifying that a current session key is different than a previous session key last used for the wake-up signal; and creating a hash-based message authentication code (HMAC) using the current session key and an ID of the receiver, the resulting HMAC being the receiver ID token.

In Example 26, the subject matter of any one or more of Examples 21-25 optionally include the transceiver storing the receiver ID token to a storage area as the stored receiver ID token.

In Example 27, the subject matter of any one or more of Examples 18-26 optionally include, wherein enabling the transceiver includes disabling the LP-WUR.

In Example 28, the subject matter of Example 27 optionally includes transmitting, by the transceiver, a response frame to an originator of the wake-up signal, the response frame indicating that the transceiver is enabled.

In Example 29, the subject matter of Example 28 optionally includes, wherein the response frame is a wake-up acknowledgment (ACK) frame.

In Example 30, the subject matter of any one or more of Examples 28-29 optionally include, wherein disabling the LP-WUR is in response to transmitting the response frame.

Example 31 is a system comprising means to perform any of the methods of Examples 18-30.

Example 32 is a machine readable medium including instructions that, when executed by a machine, cause the machine to perform any of the methods of Examples 18-30.

Example 33 is a machine implemented method for secure wireless low-power wake-up, the method comprising: creating a key-hashed receiver ID token from a key and an identification (ID) of a remote transceiver; and transmitting a wake-up signal to a low-power wake-up receiver (LP-WUR) that corresponds to the remote transceiver, the wake-up signal including the key-hashed receiver ID.

In Example 34, the subject matter of Example 33 optionally includes receiving the key from a last secure communication with the remote transceiver.

In Example 35, the subject matter of any one or more of Examples 33-34 optionally include: verifying that a session key for a last secure communication with the remote transceiver is different than a session key of a previous wake-up signal; and using the session key as the key.

In Example 36, the subject matter of any one or more of Examples 33-35 optionally include: receiving a response packet from the remote transceiver indicating that the remote transceiver is awake; and transmitting data to the remote transceiver.

Example 37 is a system comprising means to perform any of the methods of Examples 33-36.

Example 38 is a machine readable medium including instructions that, when executed by a machine, cause the machine to perform any of the methods of Examples 33-36.

Example 39 is a component of a low-power wake-up receiver (LP-WUR) for secure wireless low-power wake-up, the component comprising: a receiver to receive a wake-up signal; a decoder to extract a key-hashed receiver identification (ID) field from the wake-up signal; a comparator to perform verification on the key-hashed receiver ID; and a controller to enable a transceiver when the verification passes, the transceiver being a different radio than the LP-WUR and disabled.

In Example 40, the subject matter of Example 39 optionally includes, wherein to perform the verification includes the comparator to compare the receiver ID token to a stored receiver ID token.

In Example 41, the subject matter of Example 40 optionally includes, wherein to compare the receiver ID token with the stored receiver ID token includes the comparator to perform a bitwise comparison without additional processing, the comparison passing if the bits of the receiver ID token match the bits of the stored receiver ID token.

In Example 42, the subject matter of any one or more of Examples 40-41 optionally include the transceiver, the transceiver to generate the receiver id token.

In Example 43, the subject matter of Example 42 optionally includes, wherein to generate the receiver ID token includes the transceiver to: generate a new key value; and create a hash-based message authentication code (HMAC) using the key and an ID of the transceiver, the resulting HMAC being the receiver ID token.

In Example 44, the subject matter of Example 43 optionally includes, wherein the transceiver is to transmit the new key value to a remote transceiver, the remote transceiver providing the wake-up signal.

In Example 45, the subject matter of Example 44 optionally includes, wherein the transceiver is to disable itself following transmission of the new key value.

In Example 46, the subject matter of any one or more of Examples 42-45 optionally include, wherein to generate the receiver ID token includes the transceiver to: verify that a current session key is different than a previous session key last used for the wake-up signal; and create a hash-based message authentication code (HMAC) using the current session key and an ID of the receiver, the resulting HMAC being the receiver ID token.

In Example 47, the subject matter of any one or more of Examples 42-46 optionally include, wherein the transceiver is to store the receiver ID token to a storage area as the stored receiver ID token.

In Example 48, the subject matter of any one or more of Examples 39-47 optionally include, wherein to enable the transceiver includes the LP-WUR to disable itself in response.

In Example 49, the subject matter of Example 48 optionally includes the transceiver, the transceiver to transmit a response frame to an originator of the wake-up signal, the response frame indicating that the transceiver is enabled.

In Example 50, the subject matter of Example 49 optionally includes, wherein the response frame is a wake-up acknowledgment (ACK) frame.

In Example 51, the subject matter of any one or more of Examples 49-50 optionally include, wherein the transceiver is to disable the LP-WUR is in response to transmitting the response frame.

Example 52 is a system for secure wireless low-power wake-up, the system comprising: a low-power wake-up receiver (LP-WUR), the LP-WUR including: a receiver to receive a wake-up signal; a decoder to extract a key-hashed receiver identification (ID) field from the wake-up signal; a comparator to perform verification on the key-hashed receiver ID with a stored receiver ID; and a controller to enable a transceiver when the verification passes, the transceiver being a different radio than the LP-WUR and disabled; and a transceiver including: a key generator to acquire a key; a cryptographic component to generate a receiver ID token; and a secure controller to store the receiver ID token as the stored receiver ID.

In Example 53, the subject matter of Example 52 optionally includes, wherein to perform the verification includes the comparator to compare the receiver ID token to a stored receiver ID token.

In Example 54, the subject matter of Example 53 optionally includes, wherein to compare the receiver ID token with the stored receiver ID token includes the comparator to perform a bitwise comparison without additional processing, the comparison passing if the bits of the receiver ID token match the bits of the stored receiver ID token.

In Example 55, the subject matter of any one or more of Examples 52-54 optionally include, wherein to generate the receiver ID token includes: The key generator to generate a new key value; and The cryptographic element to create a hash-based message authentication code (HMAC) using the key and an ID of the transceiver, the resulting HMAC being the receiver ID token.

In Example 56, the subject matter of Example 55 optionally includes, wherein the transceiver is to transmit the new key value to a remote transceiver, the remote transceiver providing the wake-up signal.

In Example 57, the subject matter of Example 56 optionally includes, wherein the transceiver is to disable itself following transmission of the new key value.

Example 58 is a component of a transceiver for secure wireless low-power wake-up, the component comprising: a cryptographic component to create a key-hashed identification (ID) for a remote transceiver; an encoder to include the key-hashed ID in a wake-up signal; and a transmitter to communicate the wake-up signal to a low-power wake-up receiver (LP-WUR) that corresponds to the remote transceiver.

In Example 59, the subject matter of Example 58 optionally includes, wherein the transmitter is to receive the key from a last secure communication with the remote transceiver.

In Example 60, the subject matter of any one or more of Examples 58-59 optionally include, wherein the cryptographic element is to: verifying that a session key for a last secure communication with the remote transceiver is different than a session key of a previous wake-up signal; and using the session key as the key.

In Example 61, the subject matter of any one or more of Examples 58-60 optionally include, wherein the transmitter is to: receiving a response packet from the remote transceiver indicating that the remote transceiver is awake; and transmitting data to the remote transceiver.

Example 62 is a device for secure wireless low-power wake-up, the device comprising: means for receiving a wake-up signal at a low-power wake-up receiver (LP-WUR); means for extracting, by the LP-WUR, a receiver identification (ID) token from the wake-up signal; means for performing, by the LP-WUR, verification on the receiver ID token; and means for enabling, by the LP-WUR, a transceiver when the verification passes, the transceiver being a different radio than the LP-WUR and disabled.

In Example 63, the subject matter of Example 62 optionally includes, wherein performing the verification includes comparing the receiver ID token to a stored receiver ID token.

In Example 64, the subject matter of Example 63 optionally includes, wherein comparing the receiver ID token with the stored receiver ID token is a bitwise comparison without additional processing, the comparison passing if the bits of the receiver ID token match the bits of the stored receiver ID token.

In Example 65, the subject matter of any one or more of Examples 63-64 optionally include means for the transceiver to generate the receiver id token.

In Example 66, the subject matter of Example 65 optionally includes, wherein generating the receiver ID token by the transceiver includes: means for generating a new key value; and means for creating a hash-based message authentication code (HMAC) using the key and an ID of the transceiver, the resulting HMAC being the receiver ID token.

In Example 67, the subject matter of Example 66 optionally includes means for the transceiver to transmit the new key value to a remote transceiver, the remote transceiver providing the wake-up signal.

In Example 68, the subject matter of Example 67 optionally includes means for disabling the transceiver following transmitting the new key value.

In Example 69, the subject matter of any one or more of Examples 65-68 optionally include, wherein generating the receiver ID token by the transceiver includes: means for verifying that a current session key is different than a previous session key last used for the wake-up signal; and means for creating a hash-based message authentication code (HMAC) using the current session key and an ID of the receiver, the resulting HMAC being the receiver ID token.

In Example 70, the subject matter of any one or more of Examples 65-69 optionally include means for the transceiver to store the receiver ID token to a storage area as the stored receiver ID token.

In Example 71, the subject matter of any one or more of Examples 62-70 optionally include, wherein enabling the transceiver includes disabling the LP-WUR.

In Example 72, the subject matter of Example 71 optionally includes means for the transceiver to transmit a response frame to an originator of the wake-up signal, the response frame indicating that the transceiver is enabled.

In Example 73, the subject matter of Example 72 optionally includes, wherein the response frame is a wake-up acknowledgment (ACK) frame.

In Example 74, the subject matter of any one or more of Examples 72-73 optionally include, wherein disabling the LP-WUR is in response to transmitting the response frame.

Example 75 is a machine implemented device for secure wireless low-power wake-up, the device comprising: means for creating a key-hashed receiver ID token from a key and an identification (ID) of a remote transceiver; and means for transmitting a wake-up signal to a low-power wake-up receiver (LP-WUR) that corresponds to the remote transceiver, the wake-up signal including the key-hashed receiver ID.

In Example 76, the subject matter of Example 75 optionally includes means for receiving the key from a last secure communication with the remote transceiver.

In Example 77, the subject matter of any one or more of Examples 75-76 optionally include: means for verifying that a session key for a last secure communication with the remote transceiver is different than a session key of a previous wake-up signal; and means for using the session key as the key.

In Example 78, the subject matter of any one or more of Examples 75-77 optionally include: means for receiving a response packet from the remote transceiver indicating that the remote transceiver is awake; and means for transmitting data to the remote transceiver.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. At least one non-transitory machine readable medium including instructions that, when executed by a machine, configure the machine to:
   generate a receiver identification (ID) token via generation of a new key value and creation of a hash-based message authentication code (HMAC) using the new key and an ID of a transceiver of the machine, the resulting HMAC being the receiver ID token;
   store the receiver ID token in a storage area accessible by a wake-up signal at a low-power wake-up receiver (LP-WUR) on the machine when the LP-WUR is enabled, the LP-WUR being a different radio than the transceiver;
   transmit, by the transceiver, the new key value to a remote transceiver;
   disable the transceiver following a transmission of the new key value;
   receive a wake-up signal at the LP-WUR from the remote transceiver;
   extract, by the LP-WUR, the receiver ID token from the wake-up signal;
   perform, by the LP-WUR, verification on the receiver ID token by a bitwise comparison, without additional processing, of the receiver ID token and the stored receiver ID token, the verification passing if the bits of the receiver ID token match the bits of the stored receiver ID token; and
   enable, by the LP-WUR, the transceiver when the verification passes.

2. The machine readable medium of claim 1, wherein to generate the receiver ID token by the transceiver includes configuring the machine to:
   verify that the new key is different than a previous key last used for the wake-up signal.

3. The machine readable medium of claim 1, wherein to enable the transceiver includes configuring the machine to disable the LP-WUR.

4. The machine readable medium of claim 3, wherein the instructions cause a transceiver of the machine to transmit a response frame to an originator of the wake-up signal, the response frame indicating that the transceiver is enabled.

5. The machine readable medium of claim 4, wherein the response frame is a wake-up acknowledgment (ACK) frame.

6. The machine readable medium of claim 4, wherein to disable the LP-WUR is in response to transmitting the response frame.

7. At least one non-transitory machine readable medium including instructions to perform secure wireless low-power wake-up, the instructions, when executed by a machine, cause the machine to:
   receive a new key value and an identification (ID) from a last secure communication with a transceiver of a remote device prior to the transceiver being disabled, the transceiver being disabled in response to sending the new key;

create a hashed-based message authentication code (HMAC) using the new key and an ID of the transceiver, wherein the HMAC is a receiver ID token; and
transmit a wake-up signal that includes the receiver token to a low-power wake-up receiver (LP-WUR) on the remote device, to enable the transceiver and permit communication with the remote device via the transceiver.

8. The machine readable medium of claim 7, wherein the instructions cause the machine to:
  verify that the new key from the last secure communication with the transceiver is different than a session key of a previous wake-up signal; and
  use the new key when it is different than the session key of the previous wake-up signal.

9. The machine readable medium of claim 7, wherein the instructions cause the machine to:
  receive a response packet from the transceiver indicating that the transceiver is awake; and
  transmit data to the remote device via the transceiver.

10. An apparatus of a wireless communication device comprising:
  a transceiver to:
    generate a receiver identification (ID) token via generation of a new key value and creation of a hash-based message authentication code (HMAC) using the new key and an ID of a transceiver of the machine, the resulting HIMAC being the receiver ID token;
    store the receiver ID token in a storage area of the apparatus that is accessible by a wake-up signal at a low-power wake-up receiver (LP-WUR) of the apparatus when the LP-WUR is enabled, the LP-WUR being a different radio than the transceiver;
    transmit the new key value to a remote transceiver; and
    disable itself following a transmission of the new key value;
  the LP-WUR comprising:
    a receiver to receive a wake-up signal;
    a decoder to extract the receiver ID token from the wake-up signal;
    a comparator to perform verification on the receiver ID token by a bitwise comparison, without additional processing, of the receiver ID token and the stored receiver ID token, the verification passing if the bits of the receiver ID token match the bits of the stored receiver ID token; and
    a controller to enable the transceiver the verification passes.

11. The apparatus of claim 10, wherein, to enable the transceiver, the controller is to disable the LP-WUR.

12. The apparatus of claim 11, wherein the transceiver is to transmit a response frame to an originator of the wake-up signal, the response frame indicating that the transceiver is enabled.

13. The apparatus of claim 12, wherein the LP-WUR is disabled in response to transmission of the response frame.

14. The apparatus of claim 12, wherein the response frame is a wake-up acknowledgment (ACK) frame.

15. The apparatus of claim 10, wherein to generate the receiver ID token, the transceiver is to verify that the new key is different than a previous key last used for the wake-up signal.

16. An apparatus of wireless communication device for secure wireless low-power wake-up, the apparatus comprising:
  a receiver to receive a new key value and an identification (ID) from a last secure communication with a transceiver of a remote device prior to the receiver being disabled, the transceiver being disabled in response to sending the new key;
  a cryptographic component to create a hashed-based message authentication code (HMAC) using the new key and an ID of the transceiver, wherein the HMAC is a receiver ID token;
  an encoder to encode the receiver II) token in a wake-up signal; and
  a transmitter to communicate the wake-up signal to a low-power wake-up receiver (LP-WUR) on the remote device to enable the transceiver and permit communication with the remote device via the transceiver.

17. The apparatus of claim 16, wherein the transmitter is to receive the new key from a last secure communication with the transceiver.

18. The apparatus of claim 16, wherein the cryptographic component is to:
  verify that the new key from the last secure communication with the transceiver is different than a session key of a previous wake-up signal; and
  use the new key when it is different than the session key of the previous wake-up signal.

19. The apparatus of claim 16, wherein the transmitter is to:
  receive a response packet from the transceiver indicating that the transceiver is awake; and
  transmit data to the transceiver.

* * * * *

UNITED STATES PATENT AND TRADEMARK OFFICE
CERTIFICATE OF CORRECTION

PATENT NO. : 9,801,060 B2
APPLICATION NO. : 14/933618
DATED : October 24, 2017
INVENTOR(S) : Min et al.

Page 1 of 1

It is certified that error appears in the above-identified patent and that said Letters Patent is hereby corrected as shown below:

In the Claims

In Column 17, Line 4, in Claim 7, after "receiver", insert --ID--

In Column 17, Line 28, in Claim 10, delete "HIM AC" and insert --HMAC-- therefor In Column 17, Line 48, in Claim 10, after "transceiver", insert --when--

In Column 18, Line 28, in Claim 16, delete "II)" and insert --ID-- therefor

Signed and Sealed this
Twenty-eighth Day of May, 2019

Andrei Iancu
*Director of the United States Patent and Trademark Office*